Figure 1:
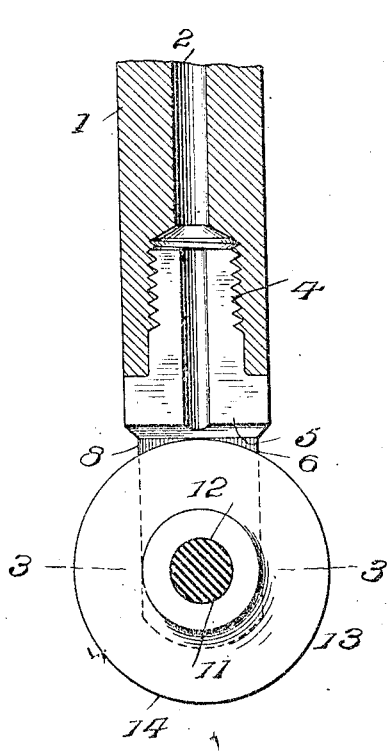

No. 892,180. PATENTED JUNE 30, 1908.
J. PATTEN & C. R. BARNETT.
DRILL BIT.
APPLICATION FILED MAY 23, 1907.

3 SHEETS—SHEET 1.

Witnesses

Inventor
John Patten
Charles R. Barnett

Attorneys

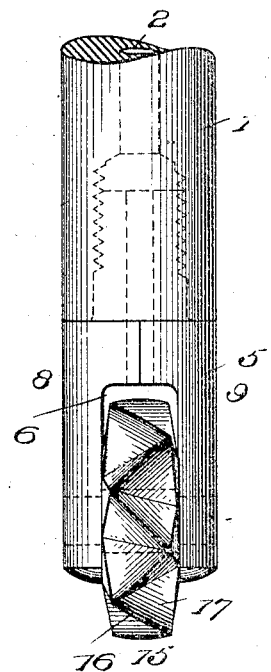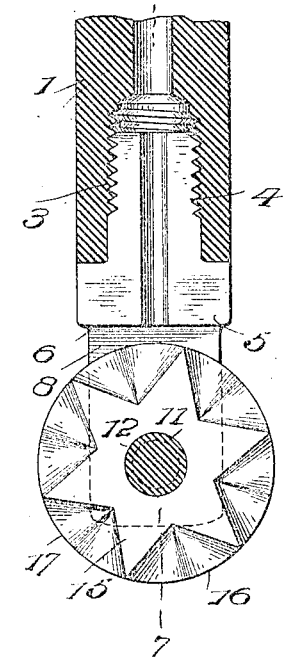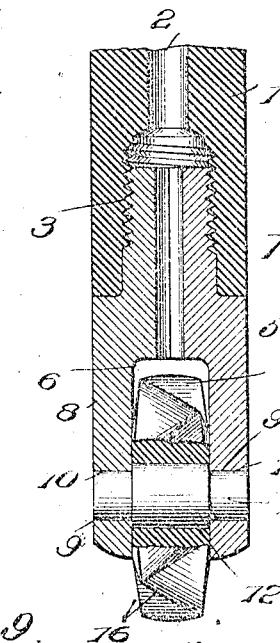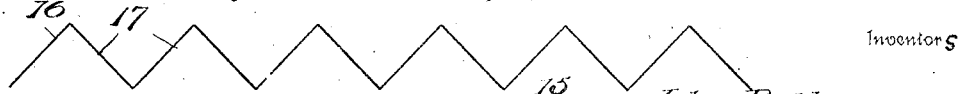

No. 892,180. PATENTED JUNE 30, 1908.
J. PATTEN & C. R. BARNETT.
DRILL BIT.
APPLICATION FILED MAY 23, 1907.
3 SHEETS—SHEET 3.
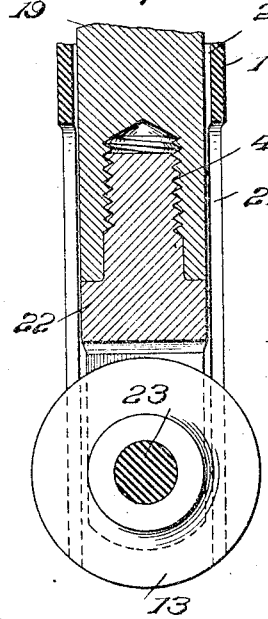
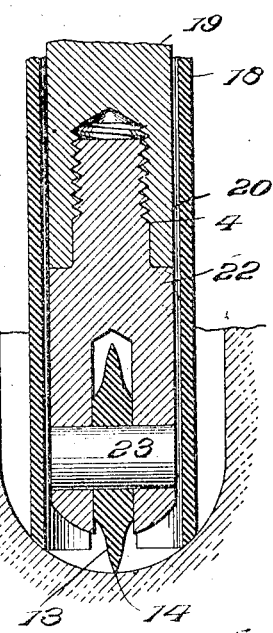
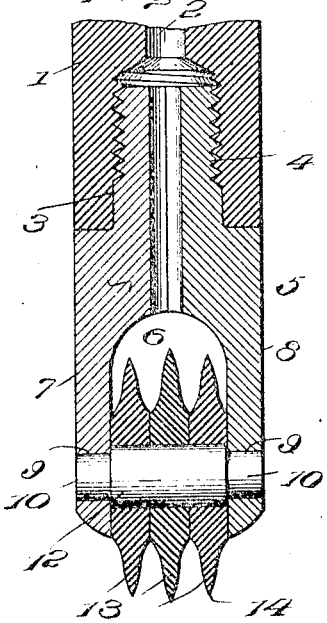
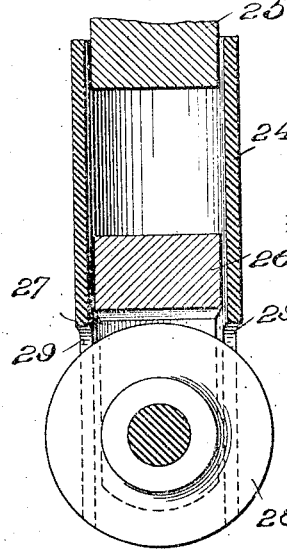
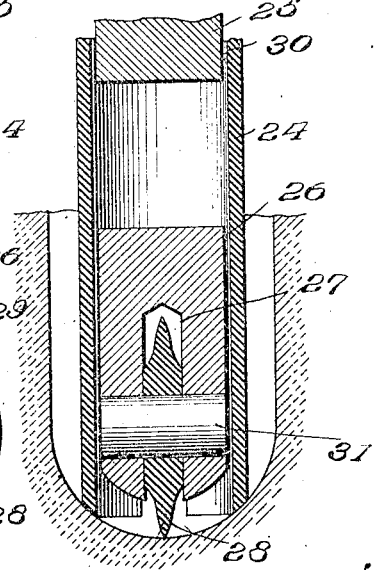
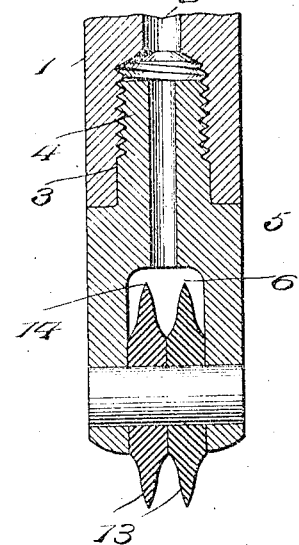
Witnesses
Inventors
John Patten
Charles R. Barnett
By
Attorneys

UNITED STATES PATENT OFFICE.

JOHN PATTEN, OF BALTIMORE, AND CHARLES R. BARNETT, OF ROLAND PARK, MARYLAND.

DRILL-BIT.

No. 892,180.

Specification of Letters Patent.

Patented June 30, 1908.

Application filed May 23, 1907. Serial No. 375,352.

*To all whom it may concern:*

Be it known that we, JOHN PATTEN and CHARLES R. BARNETT, citizens of the United States of America, residing, respectively, in the city of Baltimore and State of Maryland and at Roland Park, Baltimore county, Maryland, have invented certain new and useful Improvements in Drill-Bits, of which the following is a specification.
The present invention contemplates the provision of a cutting member for a drill for use in working stone, brick, concrete or other hard substances, and relates particularly to the form of the cutting member, and the means for supporting and directing it.

Most of the rock drills now in use have a chisel bit, either single or double, forged on the end of the drill rod. These chisel bits when in use get dull quickly, particularly on the corners and must be removed and sharpened by a blacksmith at the cost of great trouble and expense.

The cutting member herein set forth is mounted to move relatively to the shank or drill rod, so that the cutting edge is from time to time differently presented to the material and tends to be equally abraded.

In the embodiment of the invention specifically described, part only of the cutting edge is brought into contact with the material at any one stroke, so that as the position of the cutter changes in relation to the shank during the operation of the machine, a new portion of the cutting edge is constantly being brought to bear upon the material so that the wear is distributed over an edge of greater extent than in the case of a tool having a fixed cutting member. The life of the cutting member is thus increased, so that the drill need not be withdrawn, or its cutting edge renewed in boring a hole of moderate length. The configuration of the cutting member is such, that the edge has no corner or portions of a shape particularly subject to wear, which are presented to the material to become worn in advance of other parts. The cutting edge is of such shape that a portion of it is always so disposed that cutting may take place on the return stroke, as well as on the forward stroke. The cutter is adapted to be so mounted, that it may be readily removed and exchanged and is of a form conveniently carried, and easily and cheaply turned out in large quantities by drop forging.

Figure 2:
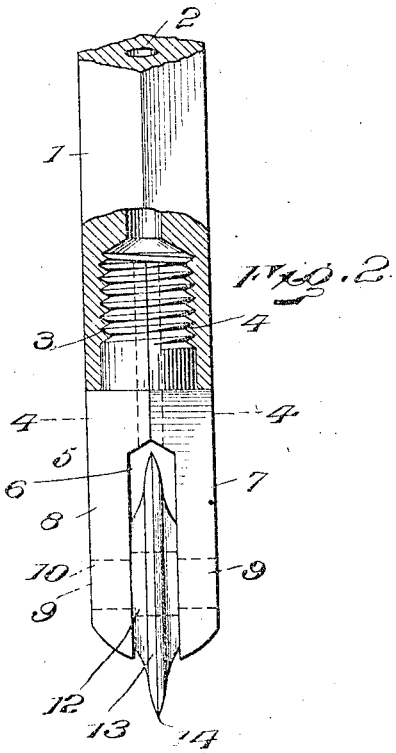
Figure 3:
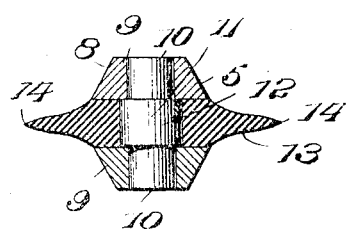
Figure 4:
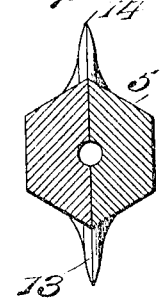

Figure 1 is a side elevation of the cutting member showing a portion of the shank in vertical cross section and half of the clevis. Fig. 2 is an elevation of the same taken at right angles to Fig. 1, a portion of the shank being broken away. Fig. 3 is a cross section taken on the line 3—3 of Fig. 1. Fig. 4 is a cross section on the line 4—4 of Fig. 2. Fig. 5 is a view of a modification corresponding to Fig. 1. Fig. 6 is an elevation of the same taken at right angles to Fig. 5. Fig. 7 is a vertical cross section of the same modification taken on the line 7—7 of Fig. 5, the cutting member being broken away to show in elevation the stud upon which it is mounted. Fig. 8 is a cross section of the cutting member, of the same modification, taken on a plane which includes the axis. Fig. 9 is of diagrammatical nature and constitutes a development of the cutting edge of the modification shown in Figs. 6, 7 and 8. Fig. 10 is a vertical cross section on a plane including the axis of a clevis and shank in which two cutting members are mounted. Fig. 11 is a similar view of a shank and clevis in connection with which three cutting members are employed. Figs. 12 and 13 show a cutting member of the type illustrated in Figs. 1–4 differently mounted. Figs. 14 and 15 show still another means of presenting the cutting member to the work.

The shank (1) see Figs. 1–7 and Figs. 10 and 11 is a steel bar or rod of suitable length provided with a central longitudinal opening
(2) through which water may be supplied from a convenient source. The end of the rod or shank remote from that at which the power is applied is counterbored and tapped at 3 to receive in threaded engagement the shank (4) of a clevis (5) which has a longitudinally extending aperture (6) registering with the channel (2) of the shank (1), and is slotted to provide two parallel arms 7—8 which are bored at right angles to the longitudinal axis of the clevis, forming openings (9) to receive the reduced extremities (10) of a stud (11), having an intermediate enlarged cylindrical portion (12) on which the disklike cutting member (13) provided with a circular edge (14) is mounted to rotate relatively to the shank. This member will hereinafter be termed a circular cutter or cutting member. The clevis is divided in the plane of its longitudinal axis at right angles to the stud (11), so that when it is withdrawn from the drill rod, the arms (7—8) may be separated, part of the clevis shank being integral with each, and the stud and cutter conveniently removed. When the parts of the clevis are placed in normal relation and screwed into the aperture of the drill rod, they form with the rod a rigid structure. This structure makes possible the use of a shouldered stud, which is intermediately enlarged, and which cannot be displaced longitudinally except by removal of the clevis from its socket.

Figs. 5 to 9 show a cutting member (15) having a cutting edge (16) which is broken into portions (17—17) shown at right angles to each other, though the portions of the cutting edge may be placed at any desired angle and are not necessarily continuous.

Figs. 10 and 11 show respectively 2 and 3 cutting members (13) mounted on a single shank; by this arrangement a greater cutting surface is obtained by the use of a disk of given diameter, and the drill is better adapted for operating on seamy rock.

Figs. 12 and 13 show the invention adapted for use in connection with a drill which is supported by means of an external tube (18) within which the shank (19) is mounted to reciprocate. The external diameter of the shank (19) and of the clevis mounted therein is slightly less than the internal diameter of the tube (18) so that a passage-way (20) for water to the surface of the material being operated upon, is afforded. The lower portion of the tube is slotted at 21 to permit reciprocation of the cutting member, which is of greater diameter than the tube. The clevis (22) employed in connection with this modification is composed of a single piece as distinguished from the split clevis of the modifications previously described, and the stud (23) upon which the cutting member is mounted, is not shouldered, but is an ordinary driven pin. This construction is made possible by the presence of the tube (18) which prevents displacement of the stud.

Figs. 14 and 15 show the cutting member in use in connection with a hammer drill having a supporting tube (24) in which a rod or hammer (25) is mounted to reciprocate. This hammer acts upon a drill shank (26) which is slotted at (27) to receive the circular cutter (28) mounted on a stud (31) which is maintained in position by means of the guiding tube. This tube is slotted at 29 to admit of slight motion in relation thereto of the cutting member which protrudes through the slots from the tube. The space (30) between the tube and hammer and drill shank serves as a channel for water. In both the latter modifications the cutter is directed by means of the external tube, and is rotated by this means about the longitudinal axis of the shank.

In the operation of the device, the cutter is presented to the work by means of a shank upon which it is mounted, and in relation to which it is adapted to rotate. In some of the modifications shown, the cutter and shank reciprocate on the line of the longitudinal axis of the latter, while in others the cutter remains in the bottom of the hole, and the bit in which it is mounted is struck a series of blows by the drill rod, which acts as a hammer. In both cases the coöperative action of the cutter and the material causes the former to rotate relatively to the shank with the result that a different portion of the cutting edge is presented to the material at each stroke, and the wear throughout the entire extent of the cutting edge is substantially uniform. We believe this rotation is due to the fact, that as the cutter reciprocates the first resistance encountered is off center: therefore rotation in one direction or the other is produced.

Because of the circular configuration of the cutting edge, part of it is oppositely disposed to that portion which acts on the material at the forward stroke of the drill, and as the shank is of less diameter than the cutter, some of this portion of the cutting edge is brought into operation on the return stroke of the drill. The result is, that a drill provided with this type of cutter may act on the material on both the forward and return strokes. This is of particular advantage, when pieces of stone become wedged behind the cutter, under which circumstances it cuts through the obstruction.

Undue wear of the cutter during the return stroke, which is an important element, and tends to greatly shorten the life of the drill bits of the type in common use, is prevented to a large extent by the rotation of the cutter. The latter yields rotatively and rolls along the sides of the hole, not being unduly worn in any one place.

The cutter, it will be noted, is of a shape which is easily made by drop forging, and may be turned out in large numbers at small cost. Also the operation of removing the cutter may be easily and quickly performed. These cutters are intended to be carried by the workmen and changed frequently, the old cutters being discarded, thus delays on account of the drill becoming dull are rendered both infrequent and of short duration. The small size of these cutters, and the small amount of material used in their manufacture makes it advisable to make them of the finest material and to temper them uniformly.

Having thus set forth our invention in several forms in which it may be embodied, we do not wish to be understood as confining ourselves to the specific details described.

What we claim and desire to secure by Letters Patent is:—

1. In a drill a shank having a circular cutter mounted to move relatively thereto, and having a continuous cutting edge adapted to be differently presented to the material at different periods of the operation of drilling.

2. A drill shank having a cutter journaled thereon provided with a cutting edge curved in a plane at right angles to the axis of the journal bearing and adapted to be differently presented to the work at different periods of the operation of drilling.

3. In a drill a shank having a cutter journaled thereon to move relatively thereto, and provided with a continuous cutting edge so that the position of the cutter is changed by contact of the same with the material.

4. A drill shank having a cutting member journaled thereon to move relatively thereto, so that the position of the cutting member is changed by contact of the same with the material so that it is differently presented to the work at different stages of the operation of drilling the cutting member having a circular cutting edge.

5. In a drill a shank having a cutting member journaled thereon to move relatively thereto, and provided with a continuous radial cutting edge only part of which is brought into operation at any one time, the said cutting member being adapted to be differently presented to the material at different stages of the operation of drilling, so that as it is differently presented to the work different portions of the cutting edge are brought into operation.

6. In a drill a bit having a cutting member provided with a cutting edge of curved outline, the said cutting member being journaled to move in relation to the shank and means on the bit for supporting the cutting member whereby such motion is permitted.

7. In a drill a shank having a cutter mounted thereon rotatable relatively thereto provided with a circular cutting edge, and adapted to present different portions of its cutting edge to the material at different periods of the operation of drilling.

8. A slotted clevis for a drill, a stud or shaft placed transversely of the slot and shouldered to engage the clevis to take up end thrust, a cutter mounted on the stud to rotate relatively to the clevis, the clevis being divided transversely of the stud, and means for holding the clevis and maintaining the two portions in normal position.

9. A drill rod having a screw threaded socket in its extremity, a clevis composed of two separate members having a screw threaded shank to engage the aperture in the rod, each member of the clevis being provided with an arm apertured at its extremity, a stud having an enlarged central cylindrical portion and reduced extremities, the inner surface of the arms engaging the shoulders formed by the ends of the enlarged portion, and a circular cutting member mounted on the stud to rotate relatively to the rod.

10. In a drill, a clevis composed of two members, each member being provided with an arm apertured to form a bearing, a stud having an enlarged central portion and reduced extremities journaled in the bearings the shoulders formed by the extremities of the enlarged portion engaging the arms to take up the end thrust of the stud, a cutter mounted on the stud intermediate of the arms, and means for maintaining the arms in operative relation.

11. In a drill, a drill rod, a circular cutting member having portions of its cutting edge oppositely disposed longitudinally of the rod, and adapted to cut during both the forward and return stroke of the drill.

12. A drill shank having a cutter mounted thereon, rotatable relatively thereto and adapted to present different portions of its cutting edge to the material at different periods of the operation of drilling, the cutting edge being deflected in the direction of the axis of rotation so as to increase the extent of cutting edge on a cutter of given size.

13. A drill shank having a cutter mounted thereon rotatable relatively thereto, the cutter being provided with a continuous cutting edge, which is deflected from the plane of rotation, its length being thereby increased.

Signed by us at Baltimore, Maryland this 20th day of May 1907.

JOHN PATTEN.
CHARLES R. BARNETT.

Witnesses:
EDWARD L. BASH,
L. H. LATHAM.